US006989182B2

(12) United States Patent
Chen et al.

(10) Patent No.: US 6,989,182 B2
(45) **Date of Patent: *Jan. 24, 2006**

(54) FLUOROELASTOMER ROLLER FOR A FUSING STATION

(75) Inventors: Jiann-Hsing Chen, Fairport, NY (US); Joseph A. Pavlisko, Pittsford, NY (US); Po-Jen Shih, Webster, NY (US); Nataly Boulatnikov, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,781

(22) Filed: Sep. 22, 2003

(65) Prior Publication Data

US 2004/0121102 A1 Jun. 24, 2004

Related U.S. Application Data

(60) Provisional application No. 60/434,953, filed on Dec. 20, 2002.

(51) Int. Cl.

| | |
|---|---|
| ***B32B 1/08*** | (2006.01) |
| ***B32B 25/00*** | (2006.01) |
| ***B32B 25/14*** | (2006.01) |
| ***B32B 27/06*** | (2006.01) |
| ***G03G 15/20*** | (2006.01) |

(52) U.S. Cl. ............... 428/36.8; 428/36.91; 428/313.5; 428/332; 428/421; 399/333; 492/56

(58) Field of Classification Search ................ 399/333; 492/56; 428/36.8, 36.91, 313.5, 315.9, 325, 428/328, 329, 332, 421, 422

See application file for complete search history.

(56) References Cited

U.S. PATENT DOCUMENTS

| | | | |
|---|---|---|---|
| 3,615,972 A | 10/1971 | Morehouse, Jr. | 156/79 |
| 3,914,360 A | 10/1975 | Gunderman et al. | 264/51 |
| 4,513,106 A | 4/1985 | Edgren et al. | 521/58 |
| 4,984,027 A | 1/1991 | Derimiggio et al. | 355/290 |
| 5,292,606 A | 3/1994 | Fitzgerald | 428/35.8 |
| 5,336,539 A | 8/1994 | Fitzgerald | 428/36.8 |
| 5,450,183 A | 9/1995 | O'Leary | 355/285 |
| 5,464,698 A | 11/1995 | Chen et al. | 428/421 |
| 5,480,724 A | 1/1996 | Fitzgerald | 428/447 |
| 5,595,823 A | 1/1997 | Chen et al. | 428/421 |
| 5,654,052 A | 8/1997 | Viser et al. | 428/35.8 |
| 5,716,714 A | 2/1998 | Chen et al. | 428/473.5 |
| 5,754,931 A | 5/1998 | Castelli et al. | 399/297 |

(Continued)

OTHER PUBLICATIONS

Cowie, Polymers: Chemistry and Physics of Modern Materials, $2^{nd}$ Edition, pp. 8-10, 1991.*

(Continued)

*Primary Examiner*—Ramsey Zacharia
(74) *Attorney, Agent, or Firm*—Carl F. Ruoff

(57) ABSTRACT

A controlled-modulus fusing station member inclusive of a durable, tough, elastically deformable layer incorporating hollow flexible filler particles. The elastically deformable layer can be a single layer on a substrate, the substrate preferably a core member of a fuser roller or a pressure roller. Alternatively, a protective or gloss control fluoropolymer layer is formed on the elastically deformable layer. The elastically deformable layer is made from a dry formulation inclusive of: a fluoroelastomer powder; microspheres in the form of unexpanded microspheres or expanded microballoons; and solid filler particles including strength-enhancing filler particles and thermal-conductivity-enhancing filler particles. The dry formulation is thermally cured or electron-beam cured.

37 Claims, 3 Drawing Sheets

U.S. PATENT DOCUMENTS

| | | | | |
|---|---|---|---|---|
| 5,916,671 | A | 6/1999 | Dauber et al. | 428/317.3 |
| 6,190,771 | B1 | 2/2001 | Chen et al. | 428/375 |
| 6,224,978 | B1 | 5/2001 | Chen et al. | 428/376 |
| 6,225,409 | B1 | 5/2001 | Davis et al. | 525/104 |
| 6,235,801 | B1 | 5/2001 | Morales et al. | 521/54 |
| 6,261,214 | B1 | 7/2001 | Meguriya | 492/56 |
| 6,355,352 | B1 | 3/2002 | Chen et al. | 428/421 |
| 6,361,829 | B1 | 3/2002 | Chen et al. | 427/380 |
| 6,429,249 | B1 | 8/2002 | Chen et al. | 524/432 |
| 6,486,441 | B1 * | 11/2002 | Chen et al. | 219/216 |
| 6,490,430 | B1 | 12/2002 | Chen et al. | 399/333 |
| 2002/0102410 | A1 | 8/2002 | Gervasi et al. | 428/421 |

OTHER PUBLICATIONS

Hawley's Condensed Chemical Dictionary, 13th Edition, p. 995, Jan. 1999.

Office Action for copending U.S. Appl. No. 10/667,548, mailed Sep. 7, 2004.

Office Action for copending U.S. Appl. No. 10/667,996, mailed Sep. 9, 2004.

Office Action for copending U.S. Appl. No. 10/668,014, mailed Sep. 9, 2004.

* cited by examiner

FLUOROELASTOMER ROLLER FOR A FUSING STATION

CROSS REFERENCE TO RELATED APPLICATION

Reference is made to and priority claimed from U.S. Provisional Application Ser. No. 60/434,953, filed Dec. 20, 2002, entitled FLUOROELASTOMER ROLLER FOR A FUSING STATION.

FIELD OF THE INVENTION

The invention relates to electrostatography and to a fusing station roller and method of making, and in particular to a conformable roller which includes a crosslinked fluorocarbon elastomeric layer incorporating both hollow fillers and solid fillers.

BACKGROUND OF THE INVENTION

In electrostatographic imaging and recording processes such as electrophotographic printing, an electrostatic latent image is formed on a primary image-forming member such as a photoconductive surface and is developed with a thermoplastic toner powder to form a toner image. The toner image is thereafter transferred to a receiver member, e.g., a sheet of paper or plastic, and the toner image is subsequently fused or fixed to the receiver member in a fusing station using heat and/or pressure. The fusing station includes a heated fuser member which can be a roller, belt, or any surface having a suitable shape for fixing thermoplastic toner powder to the receiver member. Fusing typically involves passing the toned receiver member between a pair of engaged rollers that produce an area of pressure contact known as a fusing nip. In order to form the fusing nip, at least one of the rollers typically includes a compliant or conformable layer. Heat is transferred from a heated roller fuser member to the toner in the fusing nip, causing the toner to partially melt and attach to the receiver member.

Normally included in a compliant heated fuser member roller is a resilient or elastically deformable base cushion layer (e.g., an elastomeric layer). The base cushion layer is usually covered by one or more concentric layers, including a protective outer layer. The base cushion layer is typically bonded to a core member included in the roller, with the roller having a smooth outer surface. Where the fuser member is in the form of a belt, e.g., a flexible endless belt that passes around the heated roller, it commonly has a smooth outer surface which may also be hardened. Similarly, a resilient base cushion layer can be incorporated into a deformable pressure roller used in conjunction with a relatively hard fuser roller.

Simplex fusing stations attach toner to only one side of the receiver member at a time. In this type of station, the engaged roller that contacts the unfused toner is commonly known as the fuser roller and is a heated roller. The roller that contacts the other side of the receiver member is known as the pressure roller and is usually unheated. Either or both rollers can have a compliant layer on or near the surface. It is common for one of these rollers to be driven rotatably by an external source while the other roller is rotated frictionally by the nip engagement.

In a duplex fusing station, which is less common, two toner images are simultaneously attached, one to each side of a receiver passing through a fusing nip. In such a duplex fusing station there is no real distinction between fuser roller and pressure roller, both rollers performing similar functions, i.e., providing heat and pressure.

It is known that a compliant fuser roller, when used in conjunction with a harder or relatively non-deformable pressure roller, e.g., in a Digimaster 9110 machine made by Heidelberg Digital L.L.C., Rochester, N.Y., provides easy release of a receiver member from the fuser roller, because the distorted shape of the compliant surface in the nip tends to bend the receiver member towards the relatively non-deformable unheated pressure roller and away from the much more deformable fuser roller. On the other hand, when a conformable or compliant pressure roller is used to form the fusing nip against a hard fuser roller, such as in a DocuTech 135 machine made by Xerox Corporation, Rochester, N.Y., a mechanical device such as a blade is typically necessary as an aid for releasing the receiver member from the fuser roller.

A conventional toner fuser roller includes a rigid cylindrical core member, typically metallic such as aluminum, coated with one or more synthetic layers usually formulated with polymeric materials made from elastomers. An elastically deformable or resilient base cushion layer, which may contain filler particles to improve mechanical strength and/or thermal conductivity, is typically formed on the surface of the core member, which core member may advantageously be coated with a primer to improve adhesion of the resilient layer. Roller cushion layers are commonly made of silicone rubbers or silicone polymers such as, for example, polydimethylsiloxane (PDMS) polymers disclosed, e.g., by the Chen, et al., patent (U.S. Pat. No. 6,224,978, assigned to Eastman Kodak Company, Rochester, N.Y.).

The most common type of fuser roller is internally heated, i.e., a source of heat is provided within the roller for fusing. Such a fuser roller generally has a hollow core member, inside of which is located a source of heat, usually a lamp. Surrounding the core member can be an elastomeric layer through which heat is conducted from the core member to the surface, and the elastomeric layer typically contains fillers for enhanced thermal conductivity [see for example the Fitzgerald patents (commonly assigned U.S. Pat. Nos. 5,292,606 and 5,336,539) and the Fitzgerald, et al., patent (commonly assigned U.S. Pat. No. 5,480,724)]. An internally heated fuser roller can be made using a condensation-polymerized silicone rubber material including solid filler particles, such as for example used in a NexPress 2100 digital color press (manufactured by NexPress Solutions LLC, Rochester, N.Y.).

Less common is an externally heated fuser roller, which fuser roller is typically heated by surface contact with one or more heating rollers. An externally heated fuser roller can be made using an addition-polymerized silicone rubber material including solid filler particles. Externally heated fuser rollers are for example disclosed by the O'leary patent (U.S. Pat. No. 5,450,183, assigned to Eastman Kodak Company, Rochester, N.Y.), the Derimiggio, et al., patent (commonly assigned U.S. Pat. No. 4,984,027), the Aslam, et al., patent (commonly assigned U.S. Pat. No. 6,567,641), and the Chen, et al., patent (commonly assigned U.S. Pat. No. 6,490,430). Inclusion of thermal-conductivity-enhancing fillers enhances heat transfer from one or more external heating rollers typically used for the external heating of the fuser roller. Moreover, the thermal-conductivity-enhancing fillers enable intermittent use of an auxiliary heating device located within the roller.

Some fuser rollers rely on film splitting of a low viscosity oil to enable release of the toner and (hence) receiver member from the fuser roller. The release oil is typically applied to the surface of the fuser from a donor roller coated with the oil provided from a supply sump. A donor roller is for example disclosed in the Chen, et al., patent (commonly assigned U.S. Pat. No. 6,190,771) which is hereby incorporated by reference.

Release oils (commonly referred to as fuser oils) are composed of, for example, polydimethylsiloxanes. When applied to the fuser roller surface to prevent the toner from adhering to the roller, fuser oils may, upon repeated use, interact with PDMS material included in the resilient layer(s) in the fuser roller, which in time can cause swelling, softening, and degradation of the roller. To prevent these deleterious effects caused by release oil, a thin barrier layer made of, for example, a cured fluoroelastomer and/or a silicone elastomer, is typically formed around the resilient cushion layer, as disclosed in the Davis, et al., patent (U.S. Pat. No. 6,225,409, assigned to Eastman Kodak Company, Rochester, N.Y.) and the Chen, et al., patents (U.S. Pat. No. 5,464,698, and 5,595,823, assigned to Heidelberg Digital L.L.C., Rochester, N.Y.). A fluoro-thermoplastic random copolymer outermost coating can also be used for this purpose, as disclosed in the Chen, et al., patents (commonly assigned U.S. Pat. Nos. 6,355,352 B1 and 6,361,829 B1).

To rival the photographic quality produced using silver halide technology, it is desirable that electrostatographic multicolor toner images have high gloss. To this end, it is desirable to provide a very smooth fusing member contacting the toner particles in the fusing station. A gloss control outer layer (which also serves as a barrier layer for fuser oil) can be provided as disclosed in the Chen, et al., patent application (commonly assigned U.S. patent application Ser. No. 09/608,290). A fluorocarbon thermoplastic random copolymer useful for making a gloss control coating on a fuser roller is disclosed in the Chen, et al., patent (commonly assigned U.S. Pat. No. 6,429,249).

In the fusing of the toner image to the receiver member, the area of contact of a conformable fuser roller with the toner-bearing surface of a receiver member sheet as it passes through the fusing nip is determined by the amount of pressure exerted by the pressure roller and by the characteristics of the resilient cushion layer. The extent of the contact area helps establish the length of time that any given portion of the toner image will be in contact with and heated by the fuser roller. It is generally advantageous to increase the contact time by increasing the contact area so as to result in a more efficient fusing process. However, unless the effective modulus for deforming a compliant roller in the nip is sufficiently low, high nip pressures are required to obtain a large nip area. Such high pressures can be disadvantageous and cause damage to a deformable roller, e.g., such as pressure set or other damage caused by edges of thick and/or hard receiver members as they enter or leave the nip. Hence a low modulus deformable roller is desirable.

It is known from the Chen, et al., patent (commonly assigned U.S. Pat. No. 5,716,714) that use of a relatively soft deformable fusing-station roller (e.g., a deformable pressure roller having a low effective modulus for deformation) can advantageously reduce the propensity of a fusing station nip to cause wrinkling of receiver members passing through the nip.

One way to try to create a low modulus fusing-station roller is to use a foamed material, e.g., a cured material having an open-cell or a closed-cell foam structure, with the material inclusive of suitable strength-enhancing and/or thermal-conductivity-enhancing fillers. Attempts to utilize such foamed materials, for example as base cushion layers, have not generally been successful, for a number of reasons. The thermal conductivity of closed-cell structures tends to be disadvantageously low, even when squeezed in a fusing nip. Although an open-cell structure can be squeezed relatively flat in a fusing nip, the resilience typically becomes compromised because opposite walls within the foam tend to stick together under the heat and pressure of the nip. Moreover, foamed polymeric materials generally have poor tear strength, and shear strength also tends to be low. As a result, fusing-station rollers incorporating foamed base cushion layers are quite susceptible to damage and tend to age rapidly.

In particular, attempts to make fusing-station rollers with fluoroelastomer foamed materials, which have desirable low surface energy and high thermal stability, have not been successful because of the tendency to incur a "pressure set" under the high loading typically present in fusing station nips. For example, foam rollers made with VITON® fluoroelastomers are susceptible to "pressure set".

Suitable thermal conductivity of synthetic layers used in fusing-station rollers is attainable by the use of one or more suitable particulate fillers, the thermal conductivity being determined by the filler concentration. The thermal conductivity of most polymers is very low and the thermal conductivity generally increases as the concentration of thermally conductive filler particles is increased. However, if the filler concentration is too high, the mechanical properties of a polymer are usually compromised. For example, the stiffness of the synthetic layers may be increased by too much filler, e.g., so that there is insufficient compliance to create a wide enough nip for proper fusing. Moreover, too much filler will cause the synthetic layers to have a propensity to delaminate or crack or otherwise cause failure of the roller. Because the mechanical requirements of fusing-station rollers require that the filler concentrations generally be moderate, the abilities of the layers to transport heat are thereby limited. In fact, the total concentration of strength-enhancing and thermal-conductivity-enhancing in prior art internally heated compliant fuser rollers has reached a practical maximum. As a result, the number of copies that can be fused per minute is limited, and this in turn can be the limiting factor in determining the maximum throughput rate achievable in an electrostatographic printer.

An auxiliary internal source of heat may optionally be used with an externally heated fuser roller, e.g., as disclosed in the Aslam, et al., patent (commonly assigned U.S. Pat. No. 6,567,641) and in the Chen, et al., patent (commonly assigned U.S. Pat. No. 6,490,430). Such an internal source of heat is known to be useful when the fusing station is quiescent and/or during startup when relatively cold toned receiver members first arrive at the fusing station for fusing therein. In order for such an auxiliary internal source of heat to be effective (when intermittently needed) the fuser roller must have a sufficiently large thermal conductivity. However, this requirement conflicts with a need to keep heat at the surface of an externally heated fuser roller, i.e., so as not to unnecessarily conduct heat into the interior which would compromise the fusing efficiency of the roller. On the other hand, it is important to have a high enough thermal conductivity at the surface of the fuser roller to ensure efficient transfer of heat to the fuser roller from one or more heating rollers contacting the surface. Moreover, in order to have high efficiency, externally heated fuser rollers rely to a certain extent on thermal conduction of heat around the surface of the roller.

Ways to improve upon the above-described limitations associated with externally heated elastically deformable fuser rollers (including an optional auxiliary internal source of heat) are disclosed in the Chen, et al., patent applications (commonly assigned U.S. patent application Ser. Nos. 10/139,486 and 10/139,464). In the Chen, et al., U.S. patent application Ser. No. 10/139,486, an externally heated fuser roller having improved efficiency includes a core member, a base cushion layer around the core member, a relatively thin heat storage layer around the base cushion layer, and an outer gloss control layer around the heat storage layer, wherein the heat storage layer is loaded with more thermally conductive filler than is the base cushion layer and hence has a higher thermal conductivity. In the Chen, et al., U.S. patent application Ser. No. 10/139,464, a thin heat distribution layer is further included between the heat storage layer and the outer gloss control layer. While the fusing efficiencies relating to U.S. patent application Ser. Nos. 10/139,486 and 10/139,464 are much improved, the fuser rollers (respectively having three-layer and four-layer structures around the core member) are relatively expensive to manufacture, and may be susceptible to delamination with prolonged use.

It is known that instead of solid fillers, certain hollow fillers can be included in an addition-polymerized silicone rubber for the purpose of lowering rather than increasing the thermal conductivity of a deformable fuser roller, as disclosed in the Meguriya patent (U.S. Pat. No. 6,261,214, assigned to Shin-Etsu Chemical Company, Ltd., Tokyo, Japan). In particular, the Meguriya patent discloses incorporation into the silicone rubber of hollow filler particles (also known as microballoons) manufactured under the tradename EXPANCEL® available from Expancel, Sundsvall, Sweden, and Duluth, Ga.

Hollow microballoons are well known and are disclosed for example in the Morehouse, et al., patent (U.S. Pat. No. 3,615,972, assigned to Dow Chemical Company, Midland, Mich.). Microballoons are made from thermoplastic microspheres which encapsulate a liquid blowing agent, typically a hydrocarbon liquid. Such microspheres are made in unexpanded form. The walls of the unexpanded microspheres are generally impermeable to the liquid blowing agent, i.e., diffusion of molecules of the liquid blowing agent through the walls is typically negligible. An expanded form of a microsphere, i.e., a microballoon, is obtained by heating an unexpanded microsphere to a suitable temperature so as to vaporize the blowing agent, thereby causing the microsphere to grow to a much larger size. Too high of a heating temperature can result in some loss of internal vapor pressure and a shrinking of the microballoon. Methods for expanding microspheres are disclosed in numerous patents, such as, for example, the Gunderman, et al., patent (U.S. Pat. No. 3,914,360, assigned to Dow Chemical Company, Midland, Mich.), the Edgren, et al., patent (U.S. Pat. No. 4,513,106, assigned to KemaNord AB, Stockholm, Sweden) and the Morales, et al., patent (U.S. Pat. No. 6,235,801 B1). Expansion is generally irreversible after cooling, and the expanded microballoon form is stable under normal ambient conditions and can be sold as a dry powder or alternatively as a slurry in a liquid vehicle. Expanded microspheres or microballoons which are available commercially can be incorporated into various materials, such as for example to make improved paints or lightweight parts. Unexpanded microspheres are also available commercially for incorporation into various types of materials (e.g., expandable inks) or for manufacture of solid parts, e.g., by thermal curing in a mold so as to expand the microspheres. The shell material of certain microsphere particles can include finely divided inorganic particles, e.g., silica particles.

The use of microspheres in a compressible layer of a digital printing blanket carcass is disclosed in the Castelli, et al., patent (U.S. Pat. No. 5,754,931, assigned to Reeves Brothers, Incorporated, Spartanburg, S.C.). The microspheres are uniformly distributed in a matrix material which includes thermoplastic or thermosetting resins.

The Dauber, et al., patent (U.S. Pat. No. 5,916,671, assigned to W.L. Gore & Associates, Incorporated, Newark, Del.) discloses a resilient gasket made of a composite of polytetrafluoroethylene and resilient expandable microspheres.

There remains a need to provide for an electrostatographic machine an improved fusing station having high productivity which includes fusing-station members that are simple in construction, are very durable, and are made of material that can resist gouges or pressure damage from edges of receiver members moving through a high pressure fusing nip.

Specifically, there remains a need for a tough, long lasting fuser roller which can have only one layer coated on a core member, and which is thereby simple in structure by comparison with multi-layer prior art fuser rollers. This layer is required to be chemically unreactive, stable at high temperatures, and impervious to fuser oil. Moreover, there remains a need for an improved pressure roller having a similarly simple structure and which has similar properties.

A crosslinked fluoroelastomer is a desirable material for making fuser rollers and pressure rollers, because of low surface energy, chemical inertness, imperviousness to fuser oil, and high-temperature stability.

SUMMARY OF THE INVENTION

The invention provides an improved fusing-station member for use in a fusing station of an electrostatographic machine, the fusing-station member including an elastically deformable synthetic fluoropolymer layer incorporating flexible hollow filler particles. The fusing-station member includes a fuser roller and a pressure roller. The fusing station has a fusing nip wherein a toner image is fixed to a receiver member being moved through the fusing nip. The improved fusing-station member is simple in construction, long lasting, highly durable, and can have just one synthetic layer.

In certain embodiments, the fusing-station member is an internally heated or externally heated fuser roller forming a fusing nip with a compliant, relatively soft, pressure roller. The fuser roller includes a core member and an elastically deformable layer formed around the core member. The elastically deformable layer is a highly crosslinked fluoropolymer material made by curing at elevated temperatures an uncured formulation which includes a fluoroelastomer compounded with three types of filler particles, namely hollow flexible microballoon particles, strength-enhancing solid particles, and thermal-conductivity-enhancing solid particles. A weight percent of fluorine in the formula weight of the fluoroelastomer preferably has an upper limit of about 70%.

In alternative fuser roller embodiments, unexpanded microspheres in lieu of the hollow flexible microballoon particles are compounded with strength-enhancing solid filler particles and thermal-conductivity-enhancing solid filler particles in an uncured fluoroelastomer formulation for making the elastically deformable layer.

In other fuser roller embodiments, the elastically deformable layer is overcoated with a thin protective outer layer preferably made of a fluoropolymer.

In other embodiments, the fusing-station member is a pressure roller forming a fusing nip with a compliant relatively soft fuser roller. The pressure roller includes a core member and a base cushion layer formed around the core member. The elastically deformable layer is a highly crosslinked fluoropolymer material made by curing at elevated temperature an uncured formulation which includes fluoroelastomer compounded with three types of filler particles, namely hollow flexible microballoon particles, strength-enhancing solid particles, and thermal-conductivity-enhancing solid particles. A weight percent of fluorine in the formula weight of the fluoroelastomer preferably has an upper limit of about 70%.

In alternative pressure roller embodiments, unexpanded microspheres in lieu of the hollow flexible microballoon particles are compounded with strength-enhancing solid filler particles and thermal-conductivity-enhancing solid filler particles in an uncured fluoroelastomer formulation for making the elastically deformable layer.

In other pressure roller embodiments, the elastically deformable layer is overcoated with a thin protective outer layer preferably made of a fluoropolymer.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings in which the relative relationships of the various components are illustrated. For clarity of understanding of the drawings, relative proportions depicted or indicated of the included elements may not be representative of the actual proportions, and some of the dimensions may be selectively exaggerated.

FIG. 2 shows the fuser roller of FIG. 1 further including a thin hard flexible overcoat;

DETAILED DESCRIPTION OF THE PREFERRED EMBODIMENTS

Figure 1:
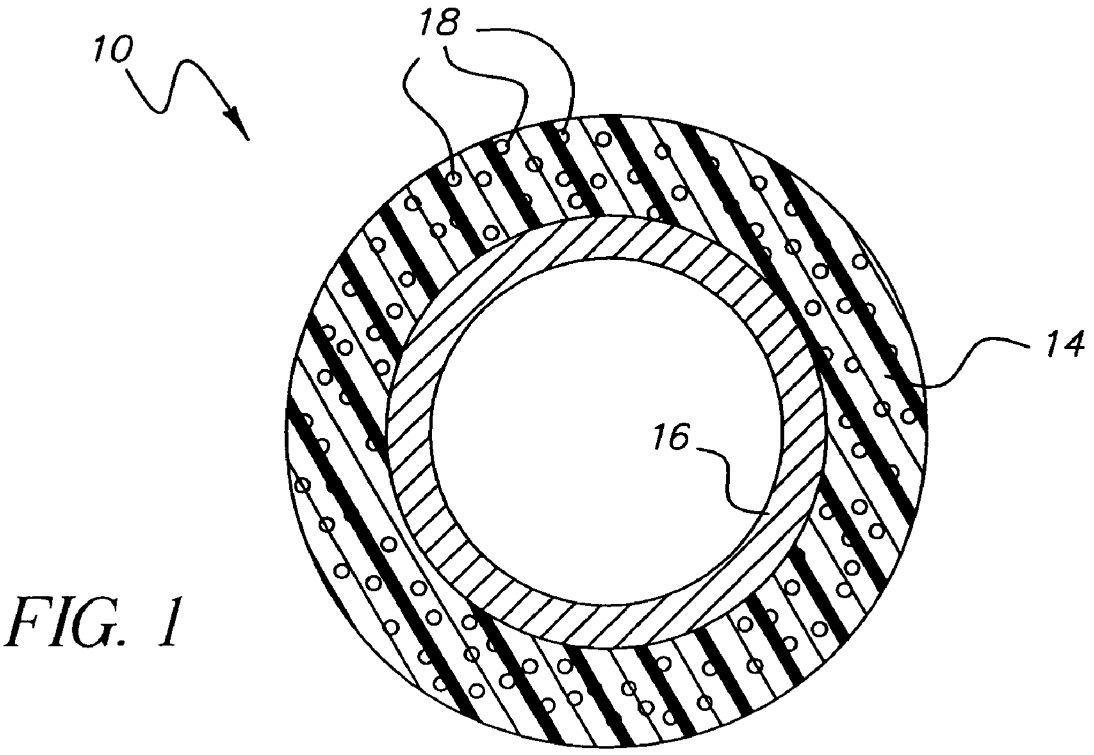
FIG. 1 shows a cross-sectional view of a fusing-station roller in the form of a fuser roller of the invention.

Fusing stations and fusing-station rollers for use according to this invention are readily includable in typical electrostatographic reproduction or printing machines of many types, such as, for example, electrophotographic color printers.

The invention relates to an electrostatographic machine for forming a toner image on a receiver member and utilizing a fusing station for thermally fusing or fixing the unfused toner image to the receiver member, e.g., a paper or a plastic sheet. The fusing station, which includes a heated fuser member forming a fusing nip with a pressure member, applies heat and pressure to fix the unfused toner image carried on the receiver member as the receiver member is moved through the fusing nip. The fuser member has an elastically deformable surface, and the pressure member is a relatively softer, compliant, member. The fuser member can be a roller, belt, or any surface suitable for fixing thermoplastic toner powder to the receiver member. A fuser member and a pressure member are referred to herein as fusing-station members, e.g., fusing-station rollers.

A fusing-station roller of the invention includes a layer made from a cured fluoroelastomer material. Preferred embodiments are controlled-modulus deformable rollers which include the fluoroelastomer cured so as to form a crosslinked fluoropolymer. An important feature of the invention is that this crosslinked fluoropolymer incorporates both solid and hollow filler particles.

Suitable uncured fluoroelastomers are commercially available. Certain types of such materials are commonly referred to as "FKM rubbers", such as for example materials sold by DuPont, Wilmington, Del., under a trademark designation, VITON®. Particularly useful are VITON® A, VITON® B, and VITON® GF. These materials are copolymers of vinylidene fluoride and hexafluoropropylene, e.g., VITON® A is hexafluoropropylene (25 mole %)-co-vinylidene fluoride (75 mole %). Other useful materials are sold by Minnesota Mining and Manufacturing Company, St. Paul, Minn. under a trademark designation, FLUOREL®. Particularly useful is FLUOREL® FX-2530, which is hexafluoropropylene (58 mole %)-co-vinylidene fluoride (42 mole %). Other useful Fluorels are vinylidene fluoride-co-tetrafluoroethylene-co-hexafluoropropylene fluoroelastomers, such as FLUOREL® FX-9038, FLUOREL® FC 2174, and FLUOREL® FC 2176. Any hexafluoropropylene-co-vinylidene fluoride or vinylidene fluoride-co-tetrafluoroethylene-co-hexafluoropropylene can be used.

In certain embodiments, the fusing-station roller is an externally heated fuser roller for use with a relatively soft pressure roller, which fuser roller preferably includes an auxiliary internal heat source. In alternative embodiments, the fuser roller is preferably internally heated. In other embodiments, the fusing-station roller is a resilient pressure roller for use with a relatively soft, compliant, fuser roller, which compliant fuser roller can be externally heated or internally heated as may be suitable.

The fusing station preferably includes the fuser roller and the pressure roller in frictional driving relation. Typically, one of the rollers is rotated via a motor, and the other roller is frictionally rotated by engagement in the fusing nip, wherein the fuser roller comes into direct contact with the unfused toner image as the receiver member is moved through the nip. An externally heated fuser roller is preferably directly heated by a dedicated external source of heat, such as by contact with one or more external heating rollers, in a well known manner. Alternatively, an externally heated fuser roller may be heated via absorbed radiation, e.g., as provided by one or more lamps, or by any other suitable external source of heat. An internally heated fuser roller includes an internal heat source, such as a lamp, as is well known. The pressure roller, which preferably is not directly heated, is typically indirectly heated to a certain extent via contact in the fusing nip.

Preferably, an oiling mechanism is provided for applying fuser oil or release oil to the surface of the fuser roller, as is well known. For example, the oiling mechanism can be a donor roll mechanism for applying a silicone oil, e.g., from a sump included in the donor roll mechanism. The fuser oil thus applied by the oiling mechanism serves to release a receiver member carrying a fused image from the fuser roller after passage of the receiver member through the fusing nip. The fuser oil is also used for purposes of preventing offset, whereby melted toner material can be disadvantageously deposited on the fuser roller.

In prior art, conformable layers of fusing-station rollers are typically protected by a coated outer barrier layer or protective layer so as to prevent harmful effects caused by interaction with hot fuser oil molecules. In certain embodiments of the invention, such an outer layer is advantageously not needed.

It is preferred for a cleaning station of the known type to be provided for cleaning the surface of the fuser roller. Additionally or alternatively, a cleaning station can be provided for cleaning the surface of the pressure roller.

The toner image in an unfused state may include a single-color toner or it may include a composite image of at least two single-color toner images, e.g., a composite image in full color made for example from superimposed black, cyan, magenta, and yellow single-color toner images. The unfused toner image is previously transferred, e.g., electrostatically, to the receiver member from one or more toner image bearing members such as primary image-forming members or intermediate transfer members. It is well established that for high quality electrostatographic color imaging with dry toners, small toner particles are necessary.

Fusing-station rollers of the invention are suitable for the fusing of dry toner particles having a mean volume weighted diameter in a range of approximately between 2 $\mu$m–9 $\mu$m, and more typically, about 7 $\mu$m–9 $\mu$m, but the invention is not limited to these size ranges. The fusing temperature to fuse such particles included in a toner image on a receiver member is typically in a range of 100° C.–200° C., and more usually, 140° C.–180° C., but the invention is not limited to these temperature ranges.

The electrostatographic reproduction or printing may utilize a photoconductive electrophotographic primary image-forming member or a non-photoconductive electrographic primary image-forming member. Particulate dry or liquid toners may be used.

Turning now to FIG. 1, a cross-sectional view of a fusing-station member is illustrated in the form of a fuser roller embodiment of the invention, identified by the numeral 10. Fuser roller 10 is an elastically deformable roller preferably for use with a relatively soft pressure roller. Fuser roller 10 includes a substrate in the form of a core member 16 and a resilient layer 14 formed on the core member. As described in detail below, an important feature of the fuser roller 10 is the presence of flexible hollow filler particles 18 incorporated in resilient layer 14.

The core member 16 is preferably rigid and preferably made of a thermally conductive material such as a metal, preferably aluminum, and has a cylindrical outer surface. The core member is typically (but not necessarily) generally tubular, as shown. The resilient layer 14 is preferably formed on the core member 16 by using an extrusion and curing technique, followed by successive post-coating curings and grindings as may be necessary.

Fuser roller 10, when being utilized in a fusing station, forms a fusing nip with a preferably relatively soft pressure roller in well known fashion (pressure roller and fusing nip not illustrated in FIG. 1). It is important to have a contact width in the fusing nip which is large so as to effect efficient transfer of heat from fuser roller 10 to a toner image carried on a receiver member moved through the nip. A preferred contact width in the fusing nip (measured perpendicular to the fuser roller rotational axis) is in a range of approximately between 13 mm–22 mm.

Resilient layer (RL) 14 is a highly crosslinked fluoropolymeric material made by a curing of an uncured formulation which includes a fluoroelastomer. RL 14 preferably includes three types of filler particles 18, namely, flexible hollow filler particles, strength-enhancing solid particles, and thermal-conductivity-enhancing solid particles. RL 14 is an elastically deformable layer; hereinafter "elastically deformable" is defined as pertaining to a Shore A durometer less than about 70.

Certain preferred embodiments of RL 14 are made by curing of formulations which include the hollow filler particles as pre-expanded hollow microballoons commercially available as manufactured powders, which pre-expanded hollow microballoons are made from unexpanded microspheres via a thermal expansion process (see Morehouse, et al., U.S. Pat. No. 3,615,972, assigned to Dow Chemical Company, Midland, Mich.). For these embodiments, the uncured formulations preferably exclude unexpanded microspheres. Expanded microballoon powders for use in the invention are obtainable from Expancel (Sundsvall, Sweden and Duluth, Ga.). Expancel is a part of the business unit, Casco Products, within Akzo Nobel, in the Netherlands. The flexible microballoons can have any suitable diameter(s). It is preferred that the included microballoons have diameters of up to approximately 120 $\mu$m.

Alternative preferred embodiments of RL 14 incorporating the hollow filler particles are made by thermal curing of alternative formulations which include unexpanded microspheres. The hollow filler particles in these alternative embodiments are formed from the unexpanded microspheres by thermal expansion into microballoons during the curing process at elevated temperatures. Preferably, such alternative uncured formulations (which also include strength-enhancing and thermal-conductivity-enhancing solid particles) exclude expanded microballoons. Varieties of such unexpanded microspheres are available commercially for subsequent thermal expansion during the curing process, which varieties can produce different ranges of expanded sizes after such heating. Unexpanded microspheres for use in uncured formulations are commercially obtainable from Expancel (Sundsvall, Sweden and Duluth, Ga.). A wide variety of post-curing size distributions of expanded microballoons having at least one distinguishable size can be created in the alternative embodiments of RL 14 by using one or more varieties of unexpanded microspheres in the uncured alternative resilient layer formulation.

Elevated temperatures useful for thermally curing RL 14 preferably exceed 150° C., as described below.

A relatively narrow size distribution of microballoon particles (in pre-expanded form) can be used to make RL 14. Alternatively, a bimodal distribution or a broad size distribution of microballoon particles can be used. A bimodal distribution can for example be made by incorporating two relatively narrow size distributions of expanded microballoons into the uncured formulation. Various sizes of expanded microballoons are commercially available, so that a wide variety of tailored size distributions can be assembled and employed in uncured formulations for making RL 14.

The walls of microspheres that can be used in uncured formulations for making RL 14, i.e., microspheres having a form that includes at least one of an expanded microballoon form and an unexpanded microsphere form, are preferably made from a polymeric material polymerized as a homopolymer or as a copolymer from one or more of the following group of monomers: acrylonitrile, methacrylonitrile, acrylate, methacrylate, and vinylidene chloride. However, any suitable monomer may be used.

The walls of expanded microsphere particles or of unexpanded microspheres useful for making RL 14 can include finely divided solid particles. Inorganic particles, e.g., oxide particles, or any other suitable finely divided inorganic particles, can be included in the walls. Additionally or alternatively, the walls of unexpanded or expanded microspheres may include finely divided organic polymeric particles.

Hereinafter the term "microsphere" refers to both unexpanded or expanded particles useful in uncured formulations for making RL 14, and the term "microballoon" generally refers to expanded microspheres. A concentration in an uncured formulation of either unexpanded or expanded microsphere particles is referred to as a microsphere concentration. Predetermined microsphere concentrations in an uncured formulation for making RL 14 are preferably in a range of approximately between 0.25%–4% by weight (w/w), and more preferably, 0.5%–3% (w/w).

Any suitable volume percentage of microspheres may be used in an uncured formulation for making RL 14. Moreover, at least one distinguishable size of expanded microballoons (or alternatively unexpanded microspheres) can be used, having either one mean size or a combination of sizes. If expanded microballoon microspheres are used, the volume percentage in the uncured formulation can be large, preferably in a range of approximately between 30%–90% by volume (v/v).

A preferred concentration by weight of strength-enhancing solid particles (sometimes referred to as structural fillers) in an uncured formulation for making RL 14 is in a range of approximately between 5%–10% (w/w). Any suitable volume percentage of strength-enhancing solid particles may be used in the uncured formulation for making RL 14.

A preferred concentration by weight of thermal-conductivity-enhancing solid particles in an uncured organosiloxane formulation for making RL 14 is in a range of approximately between 40%–70% (w/w). Any suitable volume percentage of thermal-conductivity-enhancing solid particles may be used in the uncured formulation for making RL 14.

Strength-enhancing solid filler particles are preferably silica particles, e.g., mineral silica particles or fumed silica particles. Other strength-enhancing solid fillers which can be included are particles of zirconium oxide, boron nitride, silicon carbide, carbon black, and tungsten carbide. The strength-enhancing particles preferably have a mean diameter in a range of approximately between 0.1 μm–100 μm, and more preferably, a mean diameter between 0.5 μm–40 μm.

Preferred thermal-conductivity-enhancing solid filler particles include particles of aluminum oxide, iron oxide, copper oxide, calcium oxide, magnesium oxide, nickel oxide, tin oxide, zinc oxide, graphite, carbon black, or mixtures thereof. The thermal-conductivity-enhancing particles preferably have a mean diameter in a range of approximately between 0.1 μm–100 μm, and more preferably, a mean diameter between 0.5 μm–40 μm. In a preferred embodiment, RL 14 includes aluminum oxide thermal-conductivity-enhancing particles.

For internally heated embodiments of fuser roller 10, the resilient layer 14 preferably has a thermal conductivity in a range of approximately between 0.08 BTU/hr/ft/° F.–0.7 BTU/hr/ft/° F., and more preferably, in a range of approximately between 0.2 BTU/hr/ft/° F.–0.5 BTU/hr/ft/° F.

For externally heated embodiments of fuser roller 10, the thermal conductivity of resilient layer 14 preferably has an upper limit of approximately 0.4 BTU/hr/ft/°. More preferably, the thermal conductivity of RL 14 is in a range of approximately between 0.1 BTU/hr/ft/° F.–0.35 BTU/hr/ft/° F.

A thickness of resilient layer 14 is preferably in a range of approximately between 0.005 inch–0.2 inch. More preferably, the thickness of resilient layer is in a range of approximately between 0.05 inch–0.1 inch.

For embodiments in which a thickness of resilient layer 14 is in a range of approximately between 0.05 inch–0.1 inch, it is preferred for the resilient layer to be of medium hardness, with a Shore A durometer in a range of approximately between 40–45. In other embodiments having a relatively thin resilient layer 14, a thickness of resilient layer 14 is in a range of approximately between 0.005 inch–0.020 inch and it is preferred for the resilient layer to be a hard layer having Shore A durometer in a range of approximately between 60–70.

A preferred fluoro-elastomer for making resilient layer 14 is a copolymer of the monomers vinylidene fluoride ($CH_2CF_2$), hexafluoropropylene ($CF_2CF(CF_3)$), and tetrafluoroethylene ($CF_2CF_2$), the copolymer having a composition of:

$$—(CH_2CF_2)x-, —(CF_2CF(CF_3))y-, \text{and} —(CF_2CF_2)z-,$$

wherein, x is from 30 to 90 mole percent, y is from 10 to 70 mole percent, z is from 0 to 34 mole percent, x+y+z equals 100 mole percent.

A weight percent of fluorine in the formula weight of the fluoroelastomer for making resilient layer 14 has an upper limit of about 70%.

A molecular weight of the fluoroelastomer for making resilient layer 14 is in a range of approximately between 10,000–200,000, and more preferably, in a range of approximately between 50,000–200,000.

As an alternative to fuser roller 10, the fuser member can be in the form of a flexible web (not illustrated). This web is heated for fusing in any suitable way. For example, the web can be pressed against the pressure roller by a heated back-up roller in the fusing station, such that a receiver member is moved between the web and the pressure roller for fixing a toner image thereto. The web preferably includes an elastically deformable or resilient layer formed on any suitable substrate, wherein the resilient layer includes flexible hollow filler particles and has a composition preferably similar to that of resilient layer 14. Thus the resilient layer is made with a formulation including microsphere particles (i.e., having a form that includes at least one of an expanded microballoon form and an unexpanded microsphere form) and suitable solid fillers, such as thermal-conductivity-enhancing solid filler particles and strength-enhancing solid filler particles.

A preferred relatively soft pressure roller (not illustrated) for use with fuser roller 10 includes a core member with a compliant base cushion layer preferably formed on the core member and a topcoat layer on the base cushion layer. The core member of the relatively soft pressure roller is preferably an aluminum cylinder. The thermal conductivity of the base cushion layer, while not critical, is preferred to be small enough so as not to drain a critical amount of heat from the fusing nip. A preferred base cushion layer of the relatively soft pressure roller is made of any elastomeric material for use at elevated temperatures, such as for example a highly crosslinked polydimethylsiloxane elastomer. The base cushion layer preferably includes a particulate filler. The topcoat layer, preferably having a thickness in a range of approximately between 0.001 inch–0.004 inch, is preferably made of a fluoropolymer, such as, for example, the fluorocarbon thermoplastic random copolymer of vinylidene fluoride, tetrafluoroethylene and hexafluoropropylene disclosed in the Chen, et al., patents (commonly assigned U.S. Pat. Nos. 6,355,352 B1 and 6,429,249). A preferred soft pressure roller can be similar to pressure rollers included in a NexPress 2100 digital color press (manufactured by NexPress Solutions LLC, Rochester, N.Y.).

A fusing station including the above-described fuser roller 10 and a relatively soft compliant pressure roller advantageously provides a robust fusing mechanism. The cured fluoroelastomer resilient layer 14 incorporating hollow microballoons is tough and durable, thereby providing a long-lasting roller. Moreover, fuser roller 10 advantageously has a very simple construction, i.e., a single layer formed on the core member 16.

In embodiments wherein fuser roller 10 has a relatively thin, hard resilient layer 14, the roller is especially resistant to gouging or scratching and is also resistant to high-pressure damage from the edges of receiver members passing through the fusing station. These are important advantages.

On the other hand, it can be advantageous to provide a protective layer or a gloss control layer coated on the resilient layer 14, especially for (but not limited to) those embodiments of fuser roller 10 wherein the resilient layer is relatively thicker and has medium hardness.

Thus, as illustrated in FIG. 2, a fuser roller 20 includes a core member 26, a resilient layer 24 preferably bonded to the core member, flexible hollow filler particles 28 that are incorporated in resilient layer 24, and an outer protective layer or gloss control layer 22 coated on the resilient layer. In fuser roller 20, core member 26 is similar in all respects to core member 16 of fuser roller 10 of FIG. 1, and resilient layer 24 is similar in all respects to resilient layer 14.

The outer layer 22 can be a gloss control layer in the form of a thin fluoropolymer coating made from a fluoro-thermoplastic formulation coated directly on the surface of resilient layer 24 and subsequently thermally cured, such as, for example, by using the materials and methods disclosed in the Chen, et al., patents (commonly assigned U.S. Pat. Nos. 6,355,352 B1 and 6,361,829 B1). In particular, a preferred polymeric material for gloss control layer 22 is a fluorocarbon made from a random copolymer of vinylidene fluoride ($CH_2CF_2$), hexafluoropropylene ($CF_2CF(CF_3)$), and tetrafluoroethylene ($CF_2CF_2$) monomers, the random copolymer having subunits of:

$$—(CH_2CF_2)x-, —(CF_2CF(CF_3))y-, \text{ and } —(CF_2CF_2)z-,$$

wherein, x is from 1 to 50 or from 60 to 80 mole percent, y is from 10 to 90 mole percent, z is from 10 to 90 mole percent, x+y+z equals 100 mole percent.

The gloss control layer 22 preferably has a thickness in a range of approximately between 0.001 inch–0.004 inch.

In an alternative embodiment of fuser roller 20, outer layer 22 can be a protective layer of polytetrafluoroethylene formed by spray-coating directly onto the surface of resilient layer 24. Such a polytetrafluoroethylene layer 22 preferably has a thickness in a range of approximately between 0.001 inch–0.006 inch, and more preferably in a range of approximately between 0.001 inch–0.003 inch.

In another alternative embodiment of fuser roller 20, outer layer 22 can be a layer made of a fluoroelastomer material, e.g., a VITON® material, as disclosed for example in the Chen, et al., patents (U.S. Pat. Nos. 5,464,698 and 5,595,823, assigned to Heidelberg Digital, L.L.C., Rochester, N.Y.). A fluoroelastomeric layer 22 preferably has a thickness in a range of approximately between 0.001 inch–0.004 inch.

Figure 3:
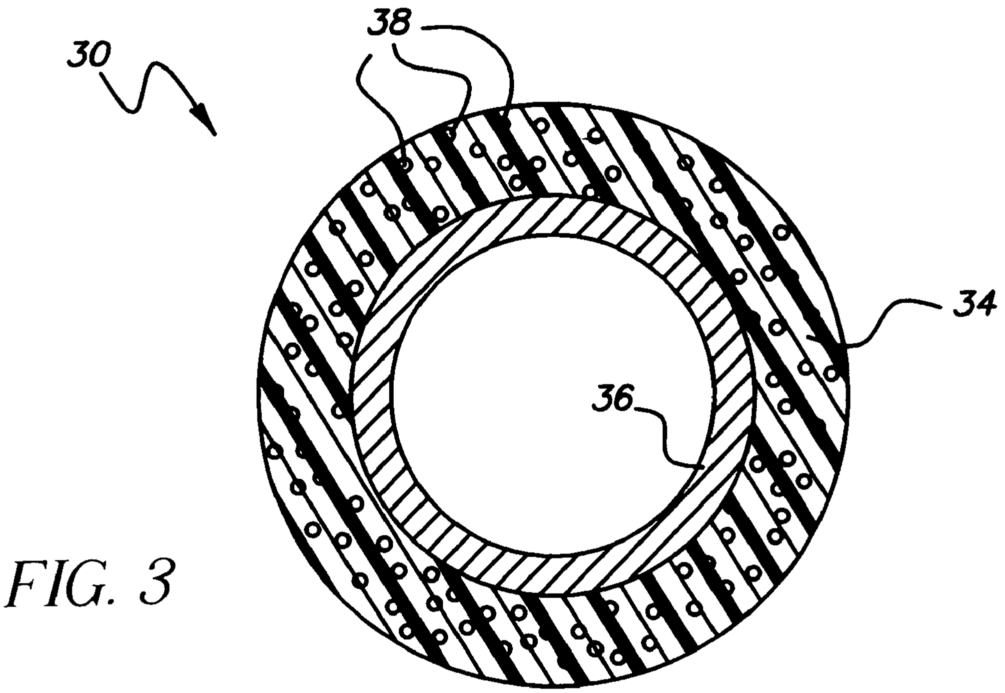
FIG. 3 shows a cross-sectional view of a fusing-station roller in the form of a pressure roller of the invention.

Turning now to FIG. 3, a cross-sectional view of a fusing-station member is illustrated in the form of a pressure roller embodiment of the invention, identified by the numeral 30. Pressure roller 30 is preferably for use with a relatively soft, compliant, fuser roller. The pressure roller 30 includes a substrate in the form of a core member 36 and a resilient layer 34 formed on the core member. Pressure roller 30 has flexible hollow filler particles 38 incorporated in resilient layer 34.

The core member 36 is similar to core member 16 of fuser roller 10.

The resilient layer (RL) 34 of pressure roller 30 is preferably made from a highly crosslinked fluoroelastomeric material, and is similar in all respects to resilient layer 14 of fuser roller 10. Thus RL 34 is made by curing a formulation which includes a fluoroelastomer and preferably three types of filler particles, namely: strength-enhancing solid particles, thermal-conductivity-enhancing solid particles, and microsphere particles in unexpanded or expanded microballoon form. The microspheres used for RL 34 are preferably similar to those used for RL 14, i.e., preferably made from a polymeric material polymerized as a homopolymer or as a copolymer from one or more of the following group of monomers: acrylonitrile, methacrylonitrile, acrylate, methacrylate, and vinylidene chloride. Also, the walls of the expanded microballoon particles or unexpanded microspheres can include finely divided inorganic particles, e.g., oxide particles, or any other suitable finely divided inorganic particles, preferably silica particles. Additionally or alternatively, the microsphere walls may include finely divided organic polymeric particles.

Certain preferred embodiments of RL 34 are made by inclusion of expanded microballoons in the uncured formulations, in similar manner as for making RL 14 of fuser roller 10 (i.e., with unexpanded microspheres preferably excluded). Various sizes of microballoon particles can be used as may be suitable.

For making alternative preferred embodiments of RL 34 of pressure roller 30, the corresponding alternative uncured formulations include unexpanded microspheres (i.e., with expanded microballoons preferably excluded). A wide variety of tailored size distributions can be assembled and employed in these alternative uncured formulations.

Predetermined microsphere concentrations in an uncured formulation for making RL 34 are preferably in a range of approximately between 0.25%–4% by weight (w/w), and more preferably, 0.5%–3% (w/w).

Any suitable volume percentage of microspheres may be used in the uncured formulation for RL 34. Moreover, any suitable sizes of expanded microballoons (or alternatively unexpanded microspheres) can be used, having either one mean size or a combination of sizes. If expanded balloon microspheres are used, the volume percentage in the uncured formulation can be large, typically in a range of approximately between 30%–90% by volume (v/v).

A preferred concentration by weight of strength-enhancing solid particles (sometimes referred to as structural fillers) in an uncured formulation for making RL 34 is in a range of approximately between 5%–10% (w/w). Any suitable volume percentage of strength-enhancing solid particles may be used in the uncured organosiloxane formulation for making RL 34.

A preferred concentration by weight of thermal-conductivity-enhancing solid particles in an uncured formulation for making RL 34 is in a range of approximately between 40%–70% (w/w). Any suitable volume percentage of thermal-conductivity-enhancing solid particles may be used in the uncured formulation for making RL 24.

In an alternative embodiment to pressure roller 30, solid filler particles having primarily a strength-enhancing property are included in an uncured formulation for making RL 34, and solid filler particles having primarily a thermal-conductivity-enhancing property are omitted.

Preferred for RL 34 are strength-enhancing solid filler particles and thermal-conductivity-enhancing solid filler particles of similar types and having similar sizes as preferably used for RL 14 of fuser roller 10.

The resilient layer 34 preferably has a thermal conductivity in a range of approximately between 0.1 BTU/hr/ft/° F.–0.2 BTU/hr/ft/° F.

Resilient layer 34 preferably has a Shore A durometer in a range of approximately between 40–70.

A thickness of resilient layer 34 preferably is in a range of approximately between 0.005 inch–0.2 inch, and more preferably, in a range of approximately between 0.05 inch–0.1 inch.

A preferred relatively soft fuser roller (not illustrated) for use with pressure roller 30 includes a core member with a base cushion layer preferably formed on the core member and a topcoat layer on the resilient layer. The core member of the relatively soft fuser roller is preferably an aluminum cylinder. The base cushion layer preferably includes thermal-conductivity-enhancing and strength-enhancing particulate fillers. The base cushion layer can for example be made of a crosslinked polydimethylsiloxane elastomer. The topcoat layer, preferably having a thickness in a range of approximately between 0.0015 inch–0.0040 inch, is preferably made of a fluoropolymer, such as for example the fluorocarbon thermoplastic random copolymer material made from copolymerized vinylidene fluoride, tetrafluoroethylene and hexafluoropropylene disclosed in the Chen, et al., patents (commonly assigned U.S. Pat. Nos. 6,355,352 B1 and 6,429,249). The relatively soft fuser roller can be heated for fusing in any known manner, e.g., using an internal heat source and/or an external heat source.

A fusing station including the above-described fuser roller 10 and a relatively soft compliant pressure roller advantageously provides a robust fusing mechanism. The cured fluoroelastomer resilient layer 14 incorporating hollow microballoons is tough and durable, thereby providing a long-lasting roller. Moreover, fuser roller 10 advantageously has a very simple construction, i.e., a single layer formed on the core member 16.

In embodiments wherein fuser roller 10 has a relatively thin, hard resilient layer 14, the roller is especially resistant to gouging or scratching and is also resistant to high-pressure damage from the edges of receiver members passing through the fusing station. These are important advantages.

On the other hand, it can be advantageous to provide a protective layer coated on the resilient layer 34.

Figure 4:
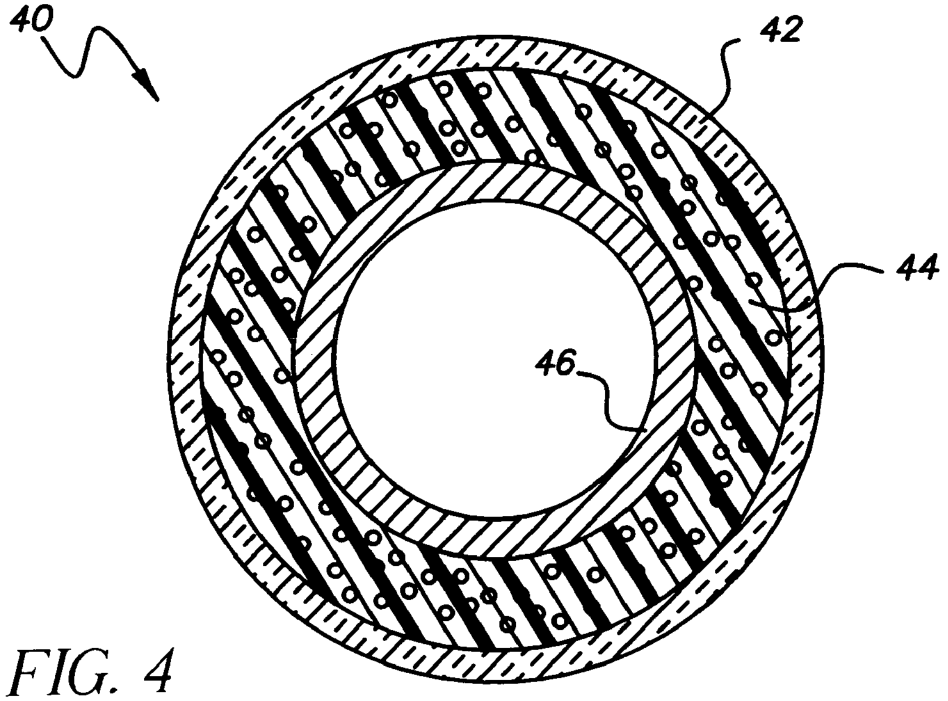
FIG. 4 shows the pressure roller of FIG. 3 further including a thin hard flexible overcoat.

Thus, as illustrated in FIG. 4, a pressure roller 40 includes a core member 46, a resilient layer 44 preferably bonded to the core member, and an outer protective layer 42 coated on the resilient layer. In pressure roller 40, core member 46 is similar in all respects to core member 26 of fuser roller 20 of FIG. 2, and resilient layer 44 is similar in all respects to resilient layer 24.

The outer layer 42 can be a protective layer in the form of a thin fluoropolymer coating made from a fluoro-thermoplastic formulation coated directly on the surface of resilient layer 44 and subsequently thermally cured, such as for example by using the materials and methods disclosed in the Chen, et al., patents (commonly assigned U.S. Pat. Nos. 6,355,352 B1 and 6,361,829 B1). In particular, a preferred polymeric material for protective layer 42 is a fluorocarbon made from a random copolymer of vinylidene fluoride ($CH_2CF_2$), hexafluoropropylene ($CF_2CF(CF_3)$), and tetrafluoroethylene ($CF_2CF_2$) monomers, the random copolymer having subunits of:

$$—(CH_2CF_2)x\text{-}, —(CF_2CF(CF_3))y\text{-}, \text{ and } —(CF_2CF_2)z\text{-},$$

wherein, x is from 1 to 50 or from 60 to 80 mole percent, y is from 10 to 90 mole percent, z is from 10 to 90 mole percent, x+y+z equals 100 mole percent.

A protective fluoropolymer layer 42 of the above composition preferably has a thickness in a range of approximately between 0.001 inch–0.004 inch.

In an alternative embodiment of pressure roller 40, outer layer 42 can be a protective layer of polytetrafluoroethylene formed by spray-coating directly onto the surface of resilient layer 44. Such a polytetrafluoroethylene layer 42 preferably has a thickness in a range of approximately between 0.001 inch–0.006 inch, and more preferably in a range of approximately between 0.001 inch–0.003 inch.

In another alternative embodiment of fuser roller 40, outer layer 42 can be a layer made of a fluoroelastomer material, e.g., a VITON® material, as disclosed for example in the Chen, et al., patents (U.S. Pat. Nos. 5,464,698 and 5,595,823, assigned to Heidelberg Digital, L.L.C., Rochester, N.Y.). A fluoroelastomeric layer 42 preferably has a thickness in a range of approximately between 0.001 inch–0.004 inch.

Figure 5:
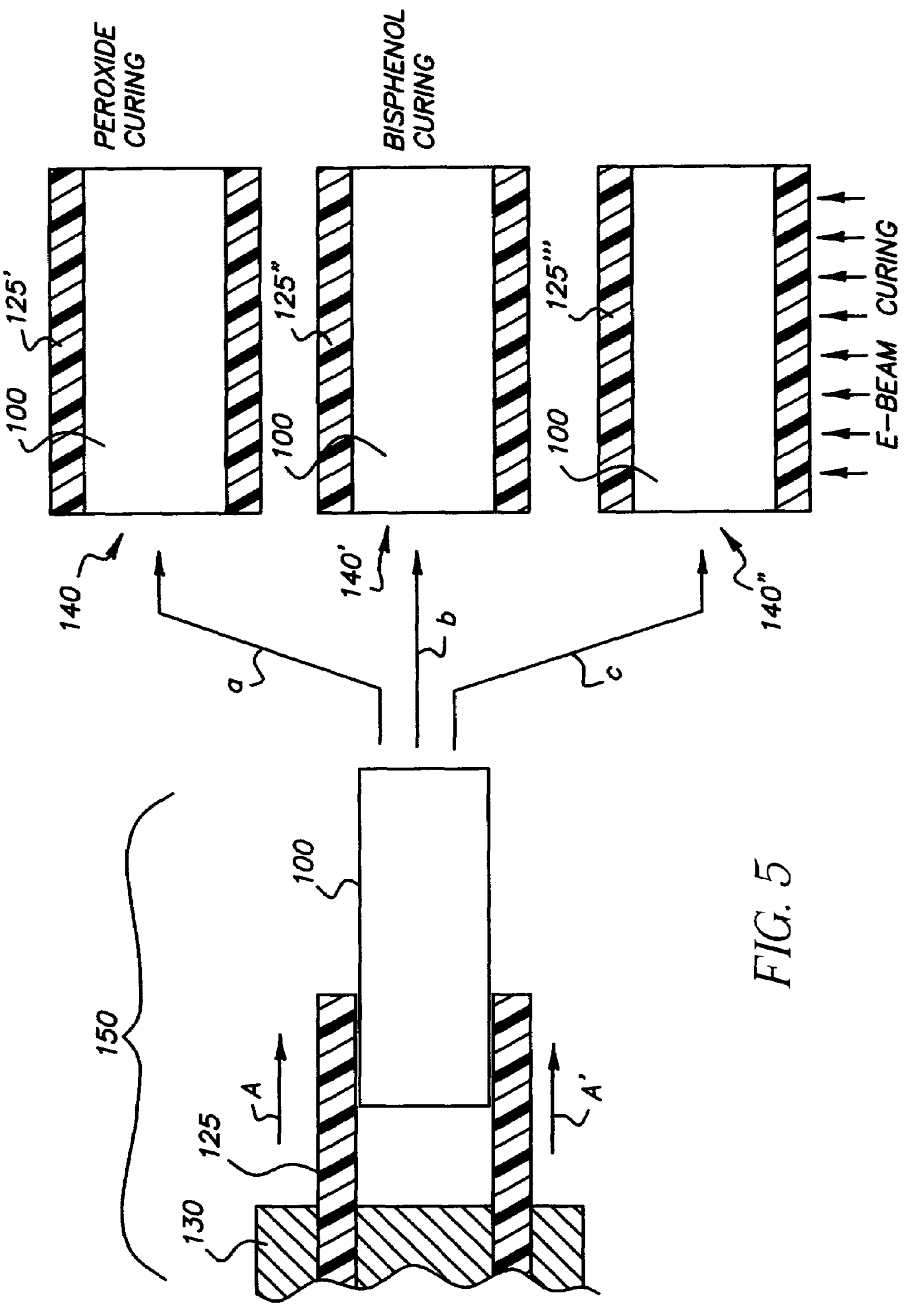
FIG. 5 schematically illustrates exemplary steps for making a fuser roller as shown in FIG. 1 and a pressure roller as shown in FIG. 3.

Forming the resilient layer on a core member so as to make a fusing-station roller of the invention is now described in general terms, with reference to FIG. 5. An uncured formulation is first prepared, e.g., for making layers 14, 24, 34 and 44 of fuser rollers 10, 20, 30 and 40, respectively. A respective uncured formulation includes ingredients as dry powders which are mixed together by any suitable means, e.g., manually or via a mechanical mixing device. Thus to prepare an uncured formulation, the microsphere particles and the strength-enhancing and thermal-conductivity-enhancing filler particles are combined with fluoroelastomer particles and blended into a uniform mixture, which mixture further includes as may be necessary a curing catalyst or a curing agent. The fluoroelastomer particles preferably have diameters in a range of approximately between 0.01 mm–1 mm. The microsphere particles can be pre-expanded microballoons, or they can be unexpanded microspheres which are transformed into microballoons during a thermal curing process.

Pre-expanded microballoons can for example be flexible hollow DE 092 particles approximately 120 $\mu$m in diameter (available from Expancel Duluth, Ga.). The DE 092 particles have walls made of a copolymer of polyacrylonitrile and polymethacrylonitrile, the walls incorporating 3%–8% (w/w) finely divided silica.

FIG. 5 includes a simplified drawing representing an extrusion process for forming a resilient layer on a core member. An extrusion apparatus 150 includes a die 130 through which an uncured formulation 125 is extruded in direction of arrows A, A' so as to produce a tubular covering around a core member 100. During extrusion, the uncured formulation 125 is heated to a temperature above the melting point of the fluoroelastomer included in the uncured formulation. This temperature is generally too low to effect a curing of the uncured formulation 125. For a preferred fluoroelastomer such as for example a VITON® or a FLUOREL®, the extrusion temperature is in a range of approximately between 80° C.–130° C. An uncovered core member 100 is initially at a suitable temperature, which suitable temperature is preferably maintained during the extrusion process until the tubular covering is complete. A mechanism (not illustrated) is provided for appropriately cutting the extruded material so that the core member 100 plus completed covering can be removed from the extrusion apparatus 150.

At least three different ways of curing are contemplated by the invention, as indicated in the right hand portion of FIG. 5.

A first way of curing, indicated by arrow "a", is a peroxide-catalyzed thermal curing process. A precursor roller 140 (formed in extrusion apparatus 150 and which includes core member 100 and an uncured layer 125') is cured at an elevated temperature, the uncured layer 125' including a thermally activated peroxide catalyst. The microsphere particles incorporated into uncured layer 125' can be in the form of expanded microballoons, or alternatively they can be unexpanded microspheres which are transformed into microballoons during the thermal curing process. The peroxide-catalyzed curing is carried out for a preferred time of approximately 1 hour at a preferred temperature in a range of approximately between 150° C.–200° C. However, any suitable curing time can be used. A preferred peroxide catalyst is 2,5 dimethyl-2,5 di(t-butylperoxy)-hexane, obtainable under the trade name Luperco 101 from Lucidol Division of Pennwalt Corporation, Buffalo, N.Y. The Luperco 101 is used at a concentration of about 3 pph by weight in the uncured formulation. This catalyst requires a co-agent, which co-agent is also included in the uncured formulation, the co-agent preferably trially cyanurate, obtainable under the trade name TAC from American Cyanamid, Wayne, N.J. The TAC co-agent is incorporated at a concentration of about 3 pph by weight in the uncured formulation.

A second way of curing a prototype roller, indicated by arrow "b", is a bisphenol thermal curing process. A precursor roller 140' (formed in extrusion apparatus 150 and including core member 100 and an uncured layer 125") is cured at an elevated temperature, the uncured layer 125" incorporating a curing agent preferably including benzyl triphenyl phosphonium chloride. The microsphere particles incorporated into uncured layer 125" can be in the form of expanded microballoons, or alternatively they can be unexpanded microspheres which are transformed into microballoons during the thermal curing process. Preferably the microsphere particles are unexpanded microspheres. The bisphenol thermal curing is carried out for a preferred time in a range of approximately between 1 hour–4 hours at a preferred temperature in a range of approximately between 230° C.–260° C. However, any suitable curing time can be used. A preferred commercial curing agent is obtainable under the trade name Curative 50 (a bisphenol residue) from DuPont, Wilmington, Del. The Curative 50 is used at a concentration of about 3 pph by weight in the uncured formulation.

It is known that at high temperatures microballoons have a propensity to shrink. Therefore the peroxide catalyzed thermal curing process is generally preferred over the bisphenol curing process because the curing temperature is significantly lower.

A third way of curing a prototype roller, indicated by arrow "c", is via electron beam process (e-beam curing). A precursor roller 140" (formed in extrusion apparatus 150 and including core member 100 and an uncured layer 125'") is cured by exposure to a high power electron beam in a well known fashion. Thus the e-beam curing can be carried out by rotating the precursor roller 140" around its longitudinal axis so that the surface moves past either a rastered or a fixed source of electrons. No curing catalyst nor curing agent is used for the e-beam curing, which is advantageous. However, owing to the limited penetration of electron beams, e-beam curing is preferred for making relatively thin resilient layers, preferably thinner than about 0.02 inch. The microsphere particles incorporated into uncured layer 125" are preferably in the form of expanded microballoons.

Although e-beam curing can be carried out on a precursor roller 140" which has been removed from the extrusion apparatus 150, as indicated in FIG. 3, it is also possible to carry out the e-beam curing inside the extrusion apparatus.

Alternative techniques (not illustrated) for forming uncured prototype rollers can be used (corresponding to the extrusion technique illustrated in FIG. 5). A first alternative technique is blade coating of an uncured formulation. Typically such a blade coating is a multiple coating, e.g., made by laying down with a blade mechanism a thin film of uncured formulation on a rotating core member, such as for example laying down about 0.005 inch of uncured formulation per rotation until a desired thickness has been deposited, the uncured formulation heated to approximately 120° F. for the blade coating and with the core member at any suitable temperature. A second alternative technique is compression molding at an elevated temperature. A third alternative technique for forming uncured prototype rollers is injection molding, which injection molding is preferably carried out using a fluoroelastomer having a molecular weight between about 10,000–50,000.

Following the curing process, a prototype roller (such as for example one of rollers 140, 140' or 140") is preferably finished via a grinding and/or polishing procedure.

Subsequent to grinding and/or polishing, the outer surface of a fuser roller 10 or a pressure roller 30 can be advantageously preconditioned for use in a fusing station by forming a thin protective skin on the surface by reacting the surface with an amine-functionalized polydimethyl siloxane oil at an elevated temperature. This is preferably done by coating the surface of the roller with the material sold as No. 8707 oil by Walker Silicone and heating the roller for about 24 hours at a temperature between about 150° C.–175° C.

An exemplary gloss control layer or protective layer can be formed on a resilient layer 125', 125", or 125'", as follows. 100 parts by weight (w/w) of fluorocarbon thermoplastic random copolymer THV 200A, 10 parts w/w of fluorinated resin, 7.44 parts w/w of zinc oxide particles having a diameter of approximately 7 $\mu$m, and 7 parts w/w aminosiloxane are mixed. THV 200A is a commercially available fluorocarbon thermoplastics random copolymer which is sold by 3M® Corporation, St. Paul, Minn. The zinc oxide particles can be obtained from a convenient commercial source, e.g., Atlantic Equipment Engineers, Bergenfield, N.J. The aminosiloxane is preferably Whitford's Amino, an amine-functionalized PDMS oil commercially available from Whitford. The fluorinated resin is preferably fluoroethylenepropylene (FEP), commercially available from DuPont, Wilmington, Del. The ingredients are mixed with 1 part w/w of Curative 50 catalyst (from DuPont) on a two-roll mill, then dissolved to form a 25 weight percent solids solution in methyl ethyl ketone. The resulting material is ring coated onto the cured resilient layer, air dried for 16 hours, baked with a 2.5 hour ramp to 275° C., held at 275° C. for 30 minutes, then held 2 hours at 260° C. and cooled slowly to room temperature. The ring coating and curing procedure can be repeated multiple times using the methyl ethyl ketone solution, resulting after, for example, two repetitions in an outer gloss control layer of fluorocarbon random copolymer having a thickness of about 0.002 inch, and a thermal conductivity of about 0.081 BTU/hr/ft/° F.

The above-described gloss control layer or protective layer can be layer 22 of fuser roller 20, or layer 42 of pressure roller 40.

A method is disclosed for making a fusing-station member for use in a fusing station of an electrostatographic machine, the fusing-station member formed from a substrate and a resilient layer adhered to the substrate, the method including the steps of: mixing of ingredients so as to produce an uncured formulation, the ingredients including fluoroelastomer particles made of a copolymer of vinylidene fluoride, hexafluoropropylene, and tetrafluoroethylene, microsphere particles, strength-enhancing solid filler particles, thermal-conductivity-enhancing solid filler particles, and a curing catalyst, wherein the microsphere particles have a concentration in the uncured formulation in a range of approximately between 0.25%–4% by weight; forming on the substrate a curable layer of the uncured formulation, the curable layer formed with a substantially uniform thickness on the substrate; and curing of the curable layer to form a cured layer on the substrate.

The method can be applied to making the fusing-station member as a roller, either as a fuser roller or as a pressure roller, wherein the substrate is preferably a core member, the core member rigid and cylindrical. The forming is preferably carried out by extruding the uncured formulation around the core member, the uncured formulation preferably at a temperature in a range of approximately between 80° C. and 130° C. during the extruding and the core member at any suitable temperature during said extruding. Forming can alternatively be carried out using one of the following techniques: blade coating, compression molding, and injection molding.

Alternatively, the method can be applied to making the fusing-station member in the form of a web, with the substrate included in the web, and the forming including any suitable coating technique.

In the method, the curing of the curable layer can be a thermal curing, the thermal curing at an elevated temperature, the elevated temperature preferably in a range of between approximately 150° C.–260° C., and after the thermal curing, an additional step is provided for cooling the cured layer on the substrate to room temperature. The curable layer for thermal curing can contain the microsphere particles as unexpanded microspheres, wherein the unexpanded microspheres are expanded to microballoons during the thermal curing. Alternatively, the microsphere particles in the uncured formulation can be expanded microballoons.

In an alternate curing procedure, the curing of the curable layer can be an electron-beam curing.

The method can further include an additional step of forming on the cured layer an outer layer, the outer layer made of a fluoropolymeric material including filler particles, with the outer layer made from one of a group of fluoropolymers including: fluoro-thermoplastic polymers, fluoroelastomers, and polytrafluoroethylene.

In summary, the invention provides a fusing-station member inclusive of a durable, tough, elastically deformable layer incorporating hollow flexible filler particles, wherein the hollow flexible filler particles provide a controlled modulus. The elastically deformable layer is preferably a single layer on a substrate, the substrate preferably a core member of a fuser roller or a pressure roller. The elastically deformable layer is made from a dry formulation inclusive of: a fluoroelastomeric powder; microspheres in the form of unexpanded microspheres or expanded microballoons; and solid filler particles including strength-enhancing filler particles and thermal-conductivity-enhancing filler particles. The dry formulation can be thermally cured or electron-beam cured. Preferably, the dry formulation is thermally cured and further includes a curing catalyst, preferably a peroxide catalyst for thermal curing at a temperature in a range of approximately between 150° C.–200° C. Alternatively, the curing catalyst can be a bisphenol residue for thermal curing at a temperature in a range of approximately between 230° C.–260° C.

The invention has been described in detail with particular reference to certain preferred embodiments thereof, but it will be understood that variations and modifications can be effected within the spirit and scope of the invention.

What is claimed is:

1. A fusing-station roller for use in a fusing station of an electrostatographic machine, said fusing-station roller elastically deformable, said fusing-station roller comprising:

a core member, said core member rigid and having a cylindrical outer surface;

a resilient layer, said resilient layer formed on said core member;

wherein said resilient layer is a fluoropolynier material, said fluoropolymer material made from an uncured formulation by a curing;

wherein said uncured formulation includes a fluoroelastomer;

wherein said uncured formulation includes microsphere particles, said microsphere particles having flexible walls;

wherein said microsphere particles have a predetermined weight percentage in said uncured formulation; and wherein in addition to said microsphere particles, said uncured formulation includes solid filler particles, wherein coated on said resilient layer is a protective layer comprising a fluoropolymer which is a random copolymer, said random copolymer made of monomers of vinylidene fluoride ($CH_2CF_2$), hexafluoropropylene ($CF_2CF(CF_3)$), and tetrafluoroethylene ($CF_2CF_2$), said random copolymer having subunits of:

$$—(CH_2CF_2)x\text{-}, —(CF_2CF(CF_3))y\text{-}, \text{and } —(CF_2CF_2)z\text{-},$$

wherein, x is from 1 to 50 or from 60 to 80 mole percent, y is from 10 to 90 mole percent, z is from 10 to 90 mole percent, x+y+z equals 100 mole percent.

2. The fusing-station roller of claim 1, wherein a type of solid filler particles includes strength-enhancing filler particles.

3. The fusing-station roller of claim 2, wherein said strength-enhancing filler particles are members of a group including particles of silica, zirconium oxide, boron nitride, silicon carbide, carbon black, and tungsten carbide.

4. The fusing-station roller of claim 2, wherein said strength-enhancing filler particles have a concentration in said uncured formulation in a range of approximately between 5%–10% by weight.

5. The fusing-station roller of claim 1, wherein a type of solid filler particles includes thermal-conductivity-enhancing filler particles.

6. The fusing-station roller of claim 5, wherein said thermal-conductivity-enhancing filler particles are selected from a group including particles of aluminum oxide, iron oxide, copper oxide, calcium oxide, magnesium oxide, nickel oxide, tin oxide, zinc oxide, graphite, carbon black, and mixtures thereof.

7. The fusing-station roller of claim 5, wherein said thermal-conductivity-enhancing filler particles have a concentration in said uncured formulation in a range of approximately between 10%–40% by weight.

8. The fusing-station roller of claim 5, wherein said thermal-conductivity-enhancing filler particles have a concentration in said uncured formulation in a range of approximately between 40%–70% by weight.

9. The fusing-station roller of claim 1, wherein said microsphere particles are hollow microballoons, said hollow microballoons having at least one distinguishable size.

10. The fusing-station roller of claim 9, wherein said hollow microballoons have diameters of up to approximately 120 $\mu$m.

11. The fusing-station roller of claim 1, wherein said microsphere particles are unexpanded microspheres, said unexpanded microspheres being expanded to microballoons during said curing, said curing at an elevated temperature.

12. The fusing-station roller of claim 11, wherein said microballoons are hollow, flexible, and have at least one distinguishable size.

13. The fusing-station roller of claim 1, wherein said predetermined microsphere concentration is in a range of approximately between 0.25%–4% by weight in said uncured formulation.

14. The fusing-station roller of claim 13, wherein said predetermined microsphere concentration is in a range of approximately between 0.5%–3% by weight in said uncured formulation.

15. The fusing-station roller of claim 1, wherein said curing of said uncured formulation is a thermal curing, said thermal curing carried out at an elevated temperature.

16. The fusing-station roller of claim 15, wherein said elevated temperature is in a range of approximately between 150° C.–200° C.

17. The fusing-station roller of claim 15, wherein said elevated temperature is in a range of approximately between 230° C.–260° C.

18. The fusing-station roller of claim 1, wherein said curing of said uncured formulation is an electron-beam curing.

19. The fusing-station roller of claim 1, wherein said flexible walls of said microsphere particles comprise a polymeric material, said polymeric material polymerized from monomers selected from the following group of monomers: acrylonitrile, methacrylonitrile, acrylate, methacrylate, vinylidene chloride, and combinations thereof.

20. The fusing-station roller of claim 1, wherein said flexible walls of said microsphere particles include finely divided particles selected from a group including inorganic particles and organic polymeric particles.

21. The fusing-station roller of claim 1, wherein a thickness of said resilient layer is in a range of approximately between 0.005 inch–0.2 inch.

22. The fusing-station roller of claim 21, wherein a thickness of said resilient layer is in a range of approximately between 0.05 inch–0.1 inch.

23. The fusing-station roller of claim 1, wherein said fusing-station roller is a fuser roller, said fuser roller internally heated.

24. The fuser roller of claim 23, wherein said thermal conductivity of said resilient layer is in a range of approximately between 0.08 BTU/hr/ft/° F.–0.7 BTU/hr/ft/° F.

25. The fuser roller of claim 24, wherein said thermal conductivity of said resilient layer is in a range of approximately between 0.2 BTU/hr/ft/° F.–0.5 BTU/hr/ft/° F.

26. The fusing-station roller of claim 1, wherein a Shore A durometer of said resilient layer is in a range of approximately between 40–70.

27. The fusing-station roller of claim 26, wherein a Shore A durometer of said resilient layer is in a range of approximately between 40–45.

28. The fusing-station roller of claim 1, wherein a Shore A durometer of said resilient layer is in a range of approximately between 60–70.

29. The fusing-station roller of claim 1, wherein said fusing-station roller is a pressure roller.

30. The pressure roller of claim 29, wherein a thermal conductivity of said resilient layer is in a range of approximately between 0.1 BTU/hr/ft/° F.–0.2 BTU/hr/ft/° F.

31. The fusing-station roller of claim 30, wherein said solid filler particles have a mean diameter in a range of approximately between 0.5–40 $\mu$m.

32. The fusing-station roller of claim 1, wherein said fluoroelastomer comprises a copolymer, said copolymer made of monomers of vinylidene fluoride ($CH_2CF_2$), hexafluoropropylene ($CF_2CF(CF_3)$), and tetrafluoroethylene ($CF_2CF_2$), said copolymer having a composition of:

$$—(CH_2CF_2)x\text{-}, —(CF_2CF(CF_3))y\text{-}, \text{ and } —(CF_2CF_2)z\text{-},$$

wherein, x is from 30 to 90 mole percent, y is from 10 to 70 mole percent, z is from 0 to 34 mole percent, x+y+z equals 100 mole percent.

33. The fusing-station roller of claim 1, wherein said solid filler particles have a mean diameter in a range of approximately between 0.1–100 $\mu$m.

34. The fusing-station roller of claim 1, wherein said fluoroelastomer in said uncured formulation is in a form of particles, said particles having diameters in a range of approximately between 0.01 mm–1 mm.

35. The fusing-station roller of claim 1, wherein coated on said resilient layer is a protective layer.

36. The fusing-station roller of claim 35, wherein said protective layer comprises a fluoropolymer.

37. The fusing station roller of claim 36, wherein said fluoropolymer is polytetrafluoroethylene.

* * * * *